United States Patent [19]
Jones

[11] Patent Number: 5,313,375
[45] Date of Patent: May 17, 1994

[54] FLOW-THRU TROFFER

[75] Inventor: Ryan D. Jones, St. Louis, Mo.

[73] Assignee: Guth Lighting Inc., St. Louis, Mo.

[21] Appl. No.: 974,093

[22] Filed: Nov. 10, 1993

[51] Int. Cl.⁵ .............................................. F21V 33/00
[52] U.S. Cl. ..................... 362/96; 362/149; 362/150; 362/218; 362/224; 362/240; 362/241; 362/248
[58] Field of Search ................. 362/96, 218, 221, 224, 362/237, 240, 241, 245, 247, 248, 253, 267, 294, 149, 150, 223; 55/385.1, 385.2

[56] References Cited

U.S. PATENT DOCUMENTS

| | | | |
|---|---|---|---|
| 2,282,587 | 5/1942 | Kurth | 362/294 |
| 3,419,714 | 12/1968 | Slauer | 362/218 |
| 4,075,775 | 2/1978 | Sshorette | 362/150 |
| 4,439,816 | 3/1984 | Litchfield | 362/96 |
| 4,461,205 | 7/1984 | Shuler | 362/218 |
| 4,681,024 | 7/1987 | Ivey | 362/149 |
| 4,683,699 | 8/1987 | Larsson | 52/775 |
| 4,683,887 | 8/1987 | Kramer et al. | 362/218 |
| 4,883,513 | 11/1989 | Monson et al. | 55/385.2 |
| 5,134,533 | 7/1992 | Hasegawa | 362/223 |

FOREIGN PATENT DOCUMENTS

| | | | |
|---|---|---|---|
| 0538594 | 3/1957 | Canada | 362/224 |
| 0003283 | 1/1977 | Japan | 362/294 |

Primary Examiner—Stephen F. Husar
Assistant Examiner—Alan B. Cariaso
Attorney, Agent, or Firm—Fitzpatrick, Cella, Harper & Scinto

[57] ABSTRACT

A light fixture for use with a high efficiency particulate air filter is disclosed which includes a peripheral frame, in which a high efficiency particulate air filter is mounted. A plurality of individual lighting elements are positioned in the frame directly beneath the filter in the direction of air flow. The individual lighting elements each include an elongated streamlined housing for receiving an elongated electric light bulb to direct laminar air flow from the filter in a non-turbulent flow pattern around the light bulbs in the housing.

41 Claims, 9 Drawing Sheets

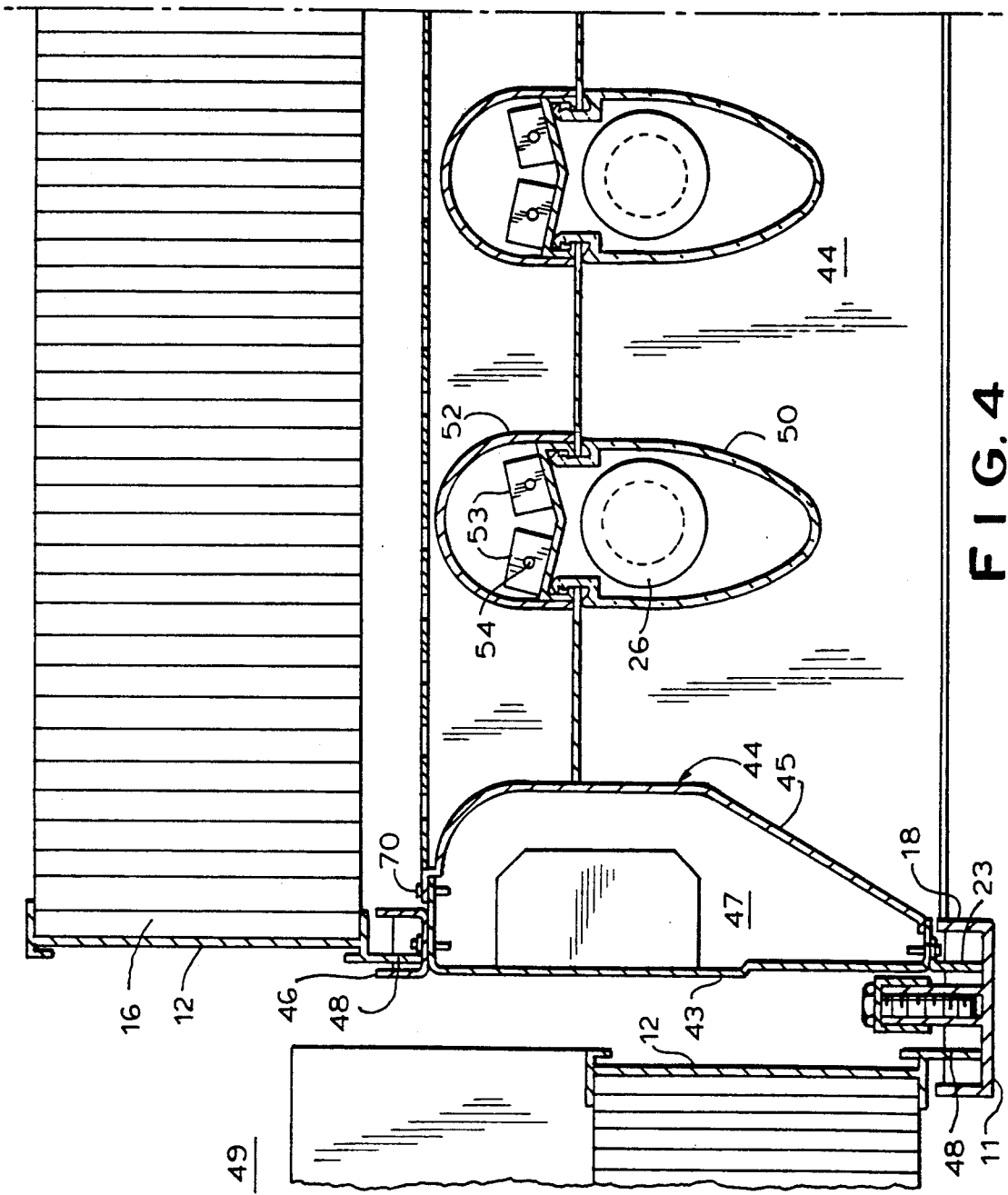

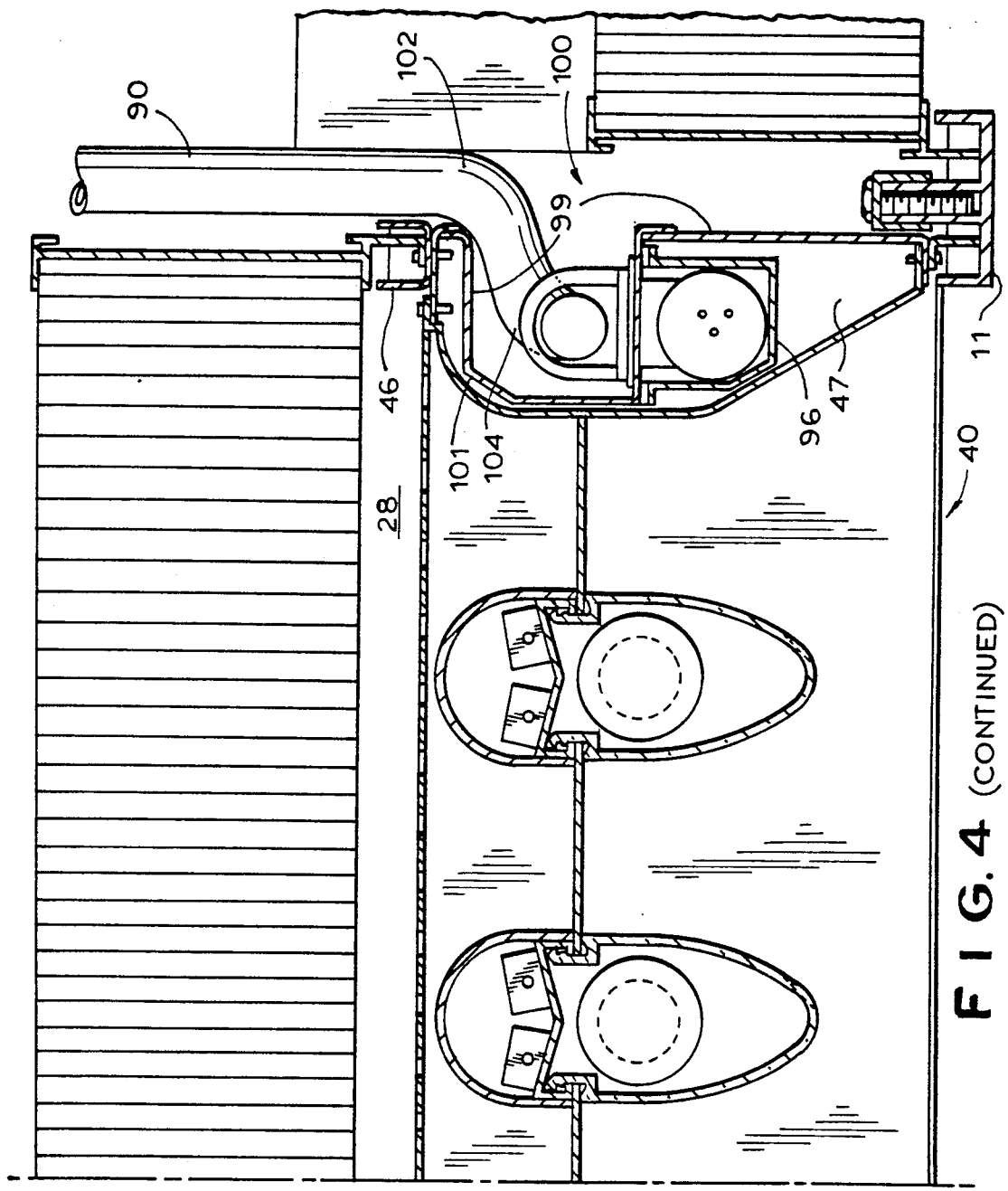

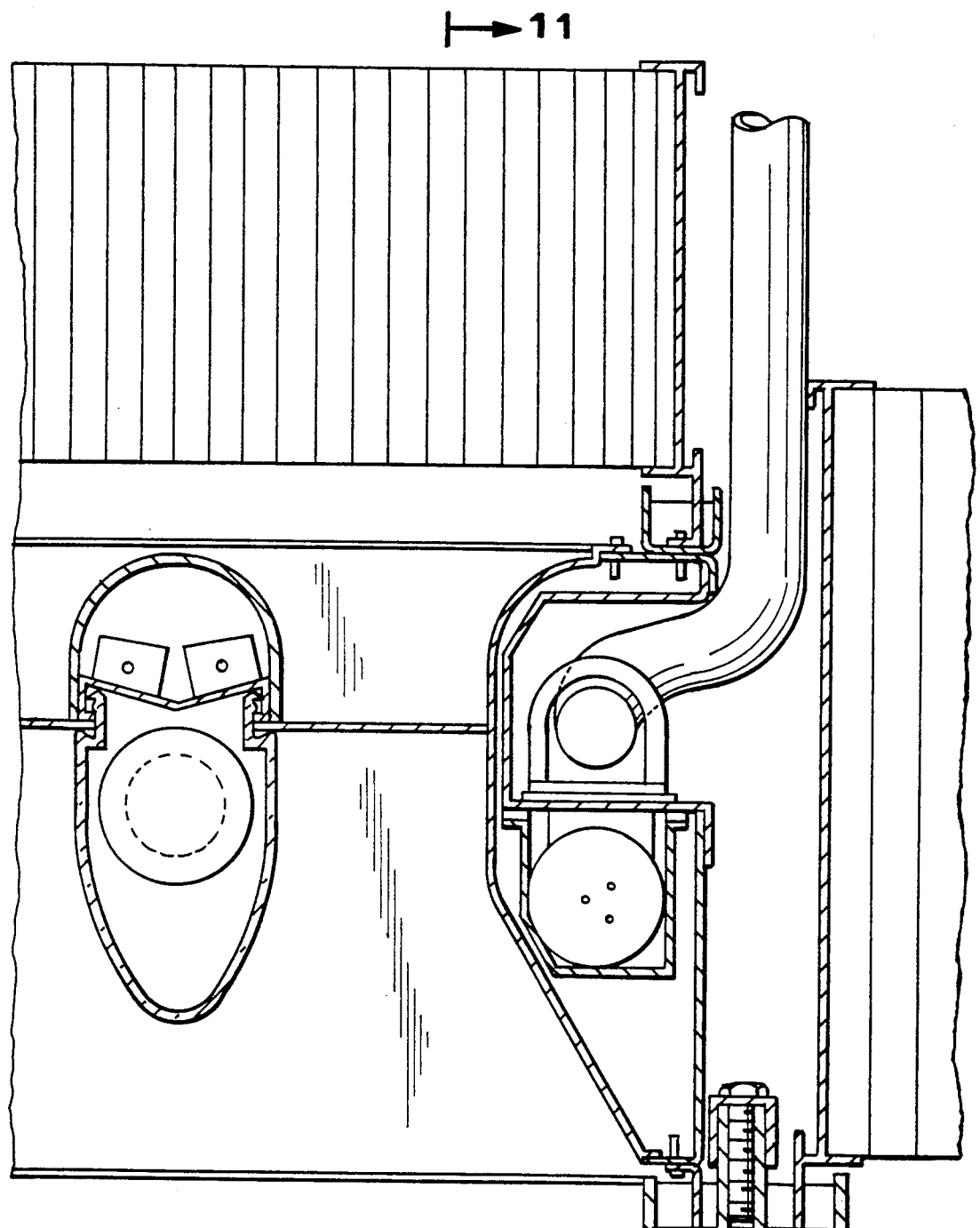
F I G. 8

FLOW-THRU TROFFER

The present invention relates to a light fixture, and more in particular to a flow-thru troffer for use in a laminar flow cleanroom.

Laminar flow cleanrooms are used in the manufacture of extremely delicate electronic equipment and in certain medical applications. They typically include ventilation systems which maintain a laminar air flow to keep air moving in a straight line from ceiling vents to floor returns. The entire design of such cleanrooms and their ventilation systems is intended to produce as little disruption in the air flow in the rooms as possible. By maintaining substantially laminar air flow, contaminant particles emitted by workers or by the work process is carried directly to a floor return and then to a high efficiency particulate air filter, also referred to as a HEPA filter.

If turbulence exists in the air flow in a cleanroom there is a chance that a particle will migrate in the cross currents of the room and be deposited onto an ultra pure workpiece or process, spoiling the product. Therefore, the ventilation and filter systems are designed to maintain a relatively constant laminar, i.e., non-turbulent, air flow across the entire ceiling area. This air flow is generally maintained at a rate of 100-200 fpm. In addition to the ventilation system per se, equal attention is also applied to equipment design and worker traffic patterns in order to keep turbulent flow patterns to an absolute minimum in the process area of the cleanroom.

The design of lighting fixtures must take these concerns into consideration in order to maintain the proper function of the cleanroom. The standards for cleanroom requirements, and the efficiency of the filters used, are quite high considering that a normally clothed worker gives off about 20,000 particles per hour when just sitting at a desk. For lower grades of cleanrooms, i.e., class 1000 to 100,000, standard cleanroom troffers are laid into ceiling grids that are not occupied by filters. Thus, certain of the ceiling grids in these cleanrooms do not have HEPA filters in them. In these kinds of cleanrooms the air flow from the ceiling filters does not directly cross the light fixture and thus the lights, themselves, do not affect the air flow. For higher class cleanrooms, i.e., class 100 or class 10 (wherein the class number is the number of 0.5 micron particles allowed in one cubic foot volume of air), filters are usually required in every ceiling grid square leaving no room for light troffers. In that case, standard teardrop shaped light fixtures are suspended from the frames or "T's" of the standard ceiling grid system, between the HEPA filters. The smooth flat sides of the teardrop light fixtures prevent laminar air flow passing on either side of the fixture from being disturbed.

It is an object of the present invention to produce an improved light troffer for use in a cleanroom.

Another object of the present invention is to provide a troffer for a cleanroom in which a plurality of light bulbs can be mounted beneath the HEPA filter and still not interfere with the generally laminar flow of air from the filter into the room.

Yet another object of the present invention is t provide an improved light troffer for a cleanroom which is relatively simple in construction and efficient in operation.

In accordance with an aspect of the present invention a light fixture or troffer is provided which includes a frame and means mounted in the frame for mounting a HEPA filter or air distribution device therein. A plurality of individual light fixtures is mounted in the frame beneath the filter in the direction of air flow. The individual light fixtures each comprise an upper generally semi-cylindrical elongated housing a shield mounted to open downwardly in the direction of air flow and means are provided for mounting an elongated light bulb in the fixture beneath the housing. An elongated teardrop shaped lens is removably mounted on the housing for enclosing a bulb with the housing. The streamlined shape of the housing, including its semi-cylindrical cross-section, combined with the teardrop shaped lens serves to maintain smooth air flow from the fixture.

The above, and other objects, features and advantages of this invention will be apparent to those skilled in the art from the following detailed description of illustrative embodiments thereof, which is to be read in connection with the accompanying drawings, wherein:

FIG. 4 is a sectional view similar to FIG. 2 and taken along line 4—4 of FIG. 3 showing the construction details of the light fixture of the present invention;

FIG. 8 is an enlarged section view of a portion of the light fixture shown in FIG. 4 showing the construction details of the conduit box for the fixture;

Figure 1:
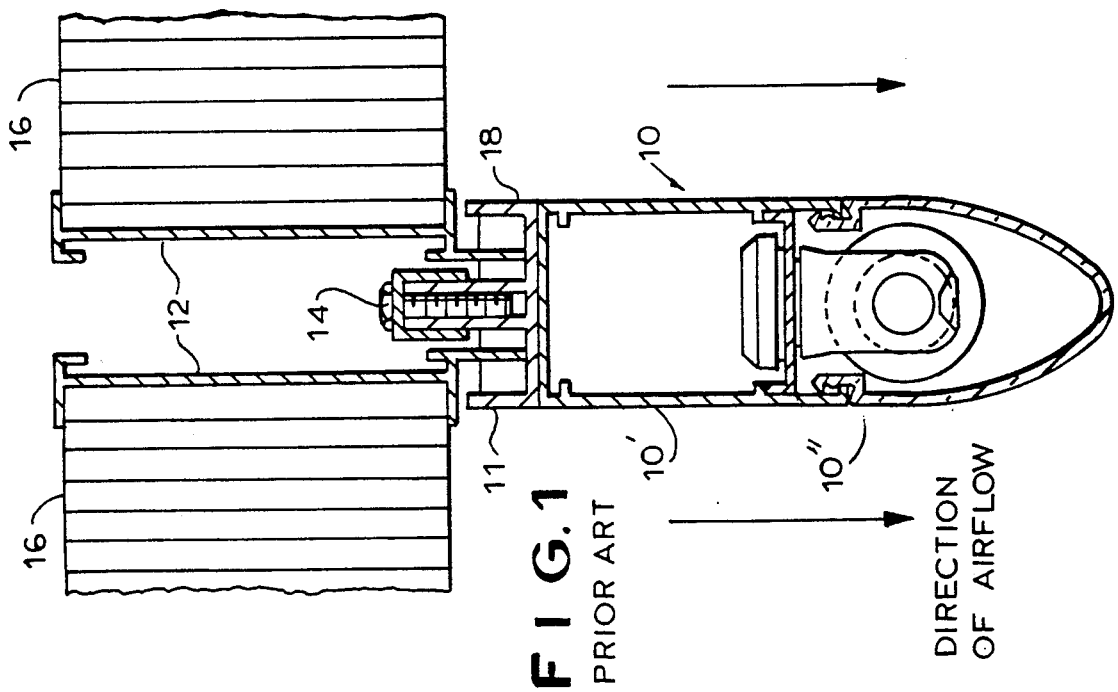
FIG. 1 is a cross-sectional view of a conventional teardrop light fixture used in a cleanroom ceiling grid.

Referring now to the drawing in detail, and initially to FIG. 1 thereof, a prior art cleanroom ceiling is disclosed which includes a teardrop shaped light fixture 10 suspended from the GEL-SEAL ceiling T 11 of a cleanroom suspended ceiling grid system. The light fixture 10 is suspended from T 11 in a conventional manner, as by bolts 14, or the like. The light fixture 10 is of known construction including a housing 10' and a snap-on teardrop shaped lens 10".

Frame members 12 of known construction are supported in the channels of the ceiling T and, in turn, support HEPA filters 16 for the cleanroom. The HEPA filters are of known construction and need not be described in detail. As seen in FIG. 1, ceiling Ts 11 have flanges 18 which extend up to the base of the filter 16 to assure that the air flowing from the filter is maintained in a smooth laminar flow.

As discussed above, teardrop fixtures of the type shown in FIG. 1 work well in most cleanroom areas, but they are limited in their light output by the nature of their installation, which usually consists of one row of fluorescent or biax lamps every four feet (i.e the standard dimension of a ceiling grid system). For some installations this does not provide sufficient light.

Figure 2:
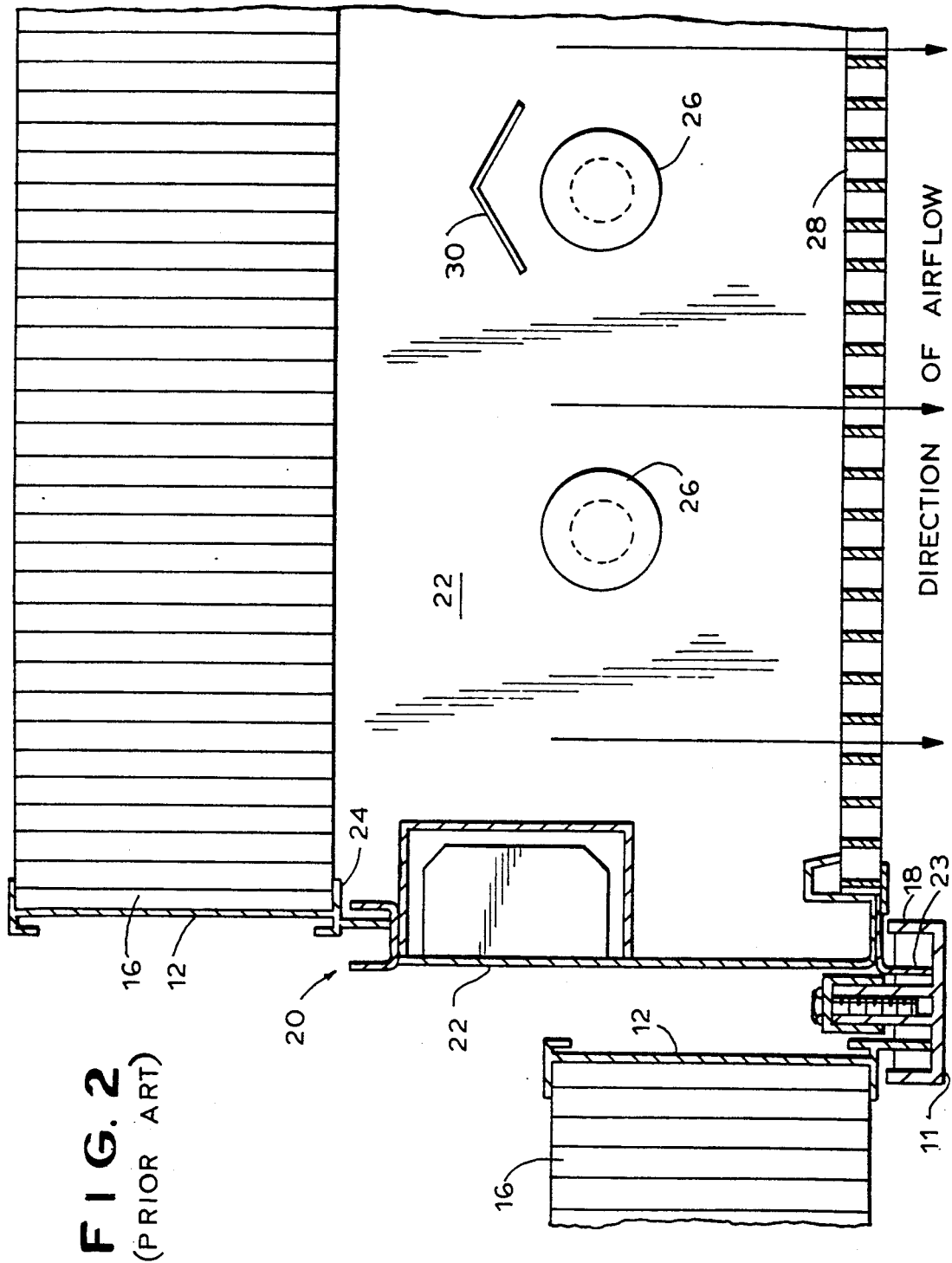
FIG. 2 is a partial sectional view of a conventional light troffer used in a cleanroom ceiling grid.

Therefore, manufacturers have developed a standard flow-thru troffer which is mounted in position in a ceiling grid square and which includes a HEPA filter placed in a tray on the top of the fixture. Such an arrangement is illustrated in FIG. 2 of the drawing wherein it is seen that the light fixture 20 of this prior art arrangement is supported on the ceiling T's 11 adjacent a conventional frame member 12 and HEPA filter 16. The troffer is supported on all four sides by T's 11 in a known manner. In this prior art arrangement the light fixture 20 includes an elongated peripheral frame 22 which includes a peripheral downwardly extending leg 23 that is received and supported on T 11 between the stem of the T and flange 18. In addition, frame 22 includes an interior peripheral flange 24 on which the frame 12 of HEPA filter 16 is supported. Fluorescent light bulbs 26 or the like extend from side-to-side of the fixture beneath the HEPA filter. In this construction, air flowing from HEPA filter 16 passes directly over bulbs 26 through a light diffuser 28 into the cleanroom. The purpose of diffuser 28 is to prevent glare, since no protective lens is provided beneath the light bulbs in such prior art devices. Preferably diffuser 28 is a perforated metal sheet having a plurality of round holes formed therein in a predetermined pattern.

The prior art troffer of FIG. 2 suffers from several disadvantages. In particular, if no reflector is used (as shown in connection with the left bulb 26 in FIG. 2) the laminar air flow from the HEPA filter passes directly over the lamp. This will cause turbulence or a velocity drop in the air flow, because a cylinder, per se, is not a good aerodynamic shape. That will affect the laminar air flow adversely. In addition, because the coefficient of reflection of HEPA filter 16 above the fluorescent bulbs is only about 0.20 (i.e., 20% of the incident light is reflected back towards the room), 80% of the light that falls on the filter from the top half of bulb 26 is absorbed and lost. For this reason, prior art flow thru troffers typically have lighting efficiencies of about 35%, as compared with regular cleanroom troffers (i.e., those that do not use HEPA filters or air flow through the troffer) which have lighting efficiencies of about 55%.

In the past, attempts have been made to increase the lighting efficiency of flow-thru troffers by providing a reflector such as the reflector 30 illustrated in connection with the right bulb in FIG. 2. While this reflector will reflect more of the light downwardly from bulb 26, the abrupt termination of the inverted V-shaped reflector will usually induce turbulent flows in the light fixture. Moreover, the reflector itself, because of its inverted V-shape, will reflect much of the light from the top half of bulb 26 back into the bulb itself. The inverted V-shape has been used to try and retain aerodynamic laminar flow, but generally without success.

In the FIG. 2 prior art embodiment an eggcrate diffuser 28 also further reduces lighting efficiency and itself may induce turbulence in the air flow. Indeed, to combat that loss of laminar flow, contractors will sometimes place a single sheet of filter paper or perforated metal over the diffuser 28 to ensure that the air flow is evened out after passing the light bulbs and upon entering the diffuser. However, this fix further reduces the lighting efficiency of the flow-thru troffer by blocking the light from the bulbs.

Figure 3:
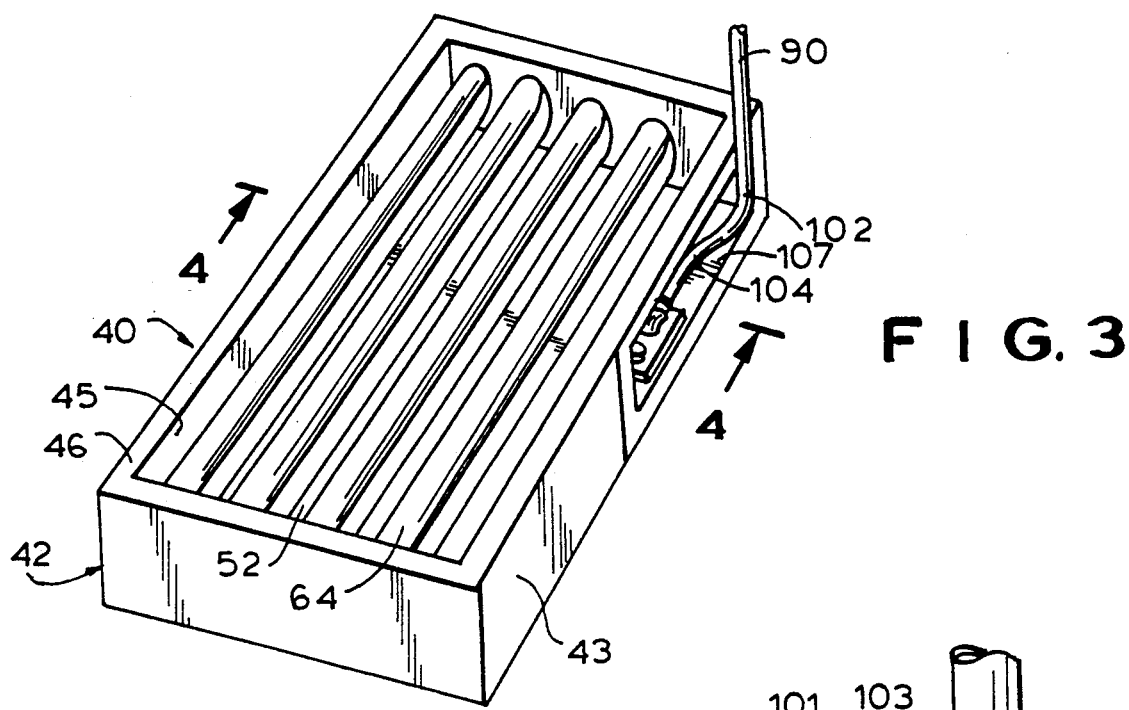
FIG. 3 is a schematic perspective view of a troffer constructed in accordance with the present invention.

Referring now to FIGS. 3 and 4 of the drawing, a light fixture or troffer 40 constructed in accordance with the present invention is illustrated. As seen in FIG. 4, the troffer fits in a ceiling grid formed of conventional ceiling T's 11. The light fixture 40 includes a peripheral frame 42 which is generally square or rectangular in shape.

In clean room applications it is important that the troffer frame be sealed against air leaks to prevent unfiltered particles from bypassing the HEPA filter (not shown in the schematic view of FIG. 3) and to insure that all air entering the room was passed through the HEPA filters. For this reason, frame 42 is formed with an outer wall 43 which is sealed all joints by a silicone sealant, or the like, in a known manner to prevent air infiltration therethrough. It also includes a downwardly extending mounting foot 23 which sits on the T 11 between the stem of the T and flange 18.

The troffer includes interior removable walls 44 which may simply be snapped in place and which have reflective inclined surfaces 45 directing light downwardly. These walls define a peripheral chamber 47 around the fixture which contains the required electrical wiring for the fixture. The walls 44 are arranged to align with flange 18 of T's 11 to maintain smooth air flow out of the troffer. Frame 42 of light fixture 40 includes an upwardly opening channel 46 located about its periphery which receives the support leg 48 of the frame 12 of a HEPA filter 16 in the same manner as such legs are supported in Ts 11.

Since the spaces between frame 42 and frames 12 of the adjacent HEPA filters are sealed by the T's 11, all air flow in the air distribution chamber 49 located above the HEPA filters, passes through the HEPA filters 16 and the troffers.

Figure 5:
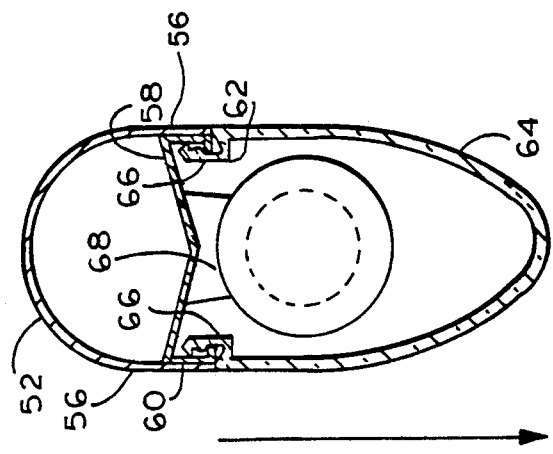
FIG. 5 is an enlarged cross-sectional view of the housing and lens assembly for the light bulbs used in the light fixture of FIG. 3.

In accordance with a feature of the present invention, a plurality of lighting elements 50 are mounted within frame 42 and extend between two opposed reflective side walls 44. These light fixtures include a generally semi-cylindrical housing or shield 52 which may be formed of sheet metal, or the like. Shields 52 extend between two opposed side walls 44 and are secured thereto in any convenient manner. The semi-cylindrical shields 52 are elongated to extend between walls 44 and, in the FIG. 5 embodiment, include generally straight parallel side wall extensions 56. In addition, an elongated reflector 58, which is slightly V-shaped, is secured within and to shields or housings 52. Reflectors 58 have downwardly bent legs 60 which extend parallel to housing legs 56 and may be spot welded, or the like, thereto. The reflector and/or the housing legs 56 include inwardly extending flanges 62.

Reflectors 58 and housing 52 may be secured to walls 44 by end ears 53 formed on the reflectors which are secured to walls 44 by sheet metal screws 54, or the like.

Figure 11:
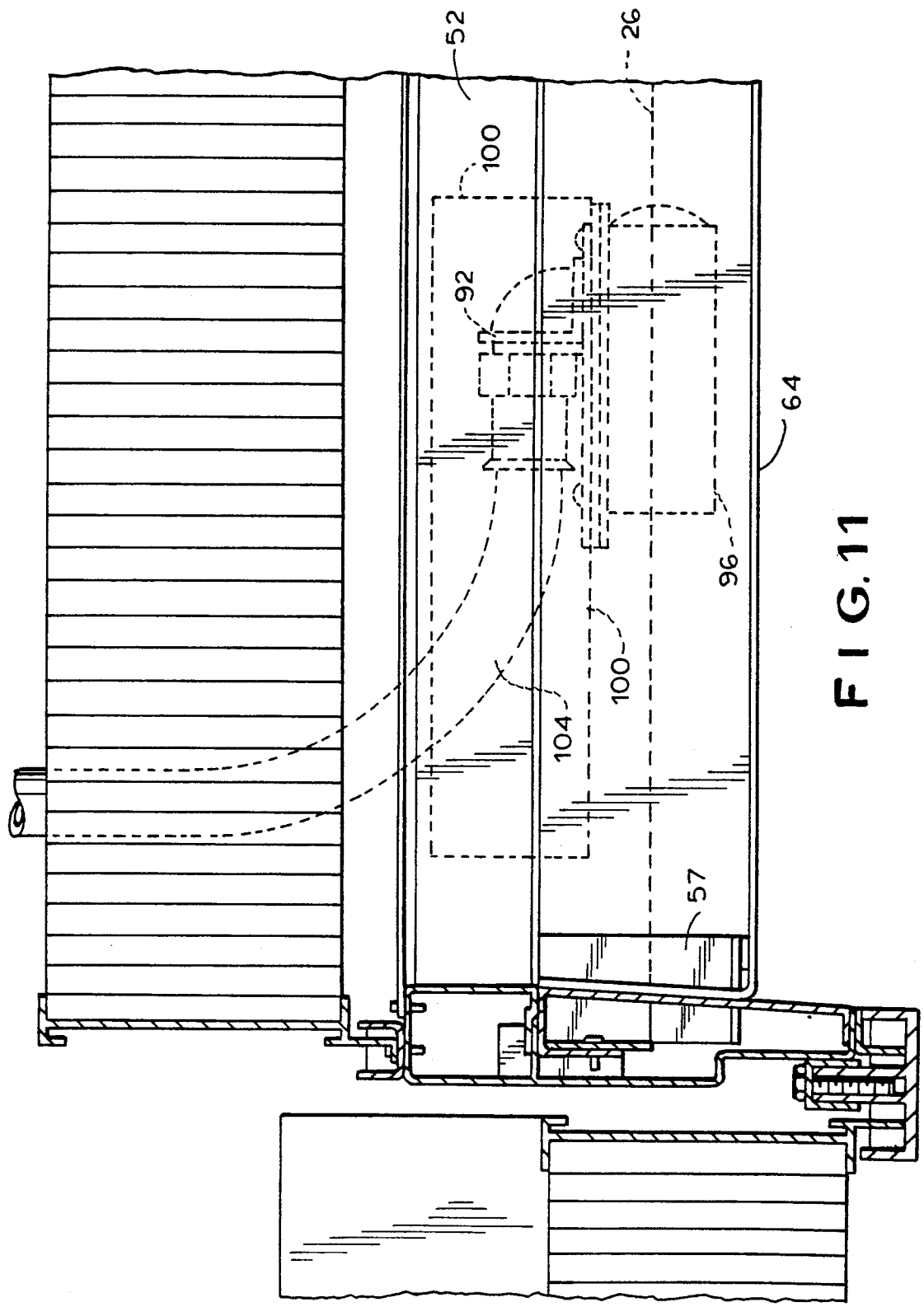
FIG. 11 is a side view taken along line 11—11 of FIG. 8.

A teardrop shaped translucent lens 64 is mounted on the lower legs 56 of the housing and 60 of the reflector. The lens is of conventional construction and has free ends 66 which have snap fingers formed thereon for removably snap locking the lens to the flanges 62 of the housing. The opposed ends of the lens are inclined to abut against and mate with the adjacent inclined surfaces of walls 44 (see FIG. 11) to insure a tight fit that avoids the production of turbulence. The ends of the lens also enclose the electrical connectors or mounts 57 for the fluorescent bulbs 26 which extend through openings in the walls 44. In another embodiment mounts 57 are adopted to mount conventional biax bulbs. The use of such bulbs is desirable in certain situations, as described hereinafter, but their shape interferes with laminar air flows. The enclosure provided by housing 52 and lenses 64 avoid this problem.

This lighting fixture or troffer solves many of the problems encountered by the prior art devices discussed above. In particular, the housings or shields 52 in the light fixtures enclose the bulbs 26 in an aerodynamic shape, thereby helping to maintain laminar flow through the fixture while increasing lighting efficiencies. With this arrangement, no light diffuser is necessary below the lighting elements 50 because the lenses 64 are designed to direct light and maintain laminar flow over the bulbs. In addition, because the housing or shields 52 have a curved surface directing air about the bulbs, the reflectors 58 used therein can have a more efficient shape for directing light from bulbs 26 downwardly and outwardly away from the bulbs, without disrupting laminar flow.

If it is found that in a particular cleanroom application a flow diffuser is necessary in order to correct irregular flow patterns leaving HEPA filter 16, the light fixtures 50 themselves will not disturb the laminar flow from the diffuser. Moreover, placing the diffuser 28 on top of the flow-thru fixture, as illustrated at the right in FIG. 4, will increase rather than decrease the lighting efficiency of the fixture since a metal diffuser will have a coefficient of reflectivity of approximately 0.50 as opposed to the bare HEPA filters' reflectivity of 0.20.

Conventional biax lamps or bulbs are often desirable for use in cleanroom applications because of their high light output, particularly in ultraviolet light in applications where a dark orange UV filter is placed over the lamp. Unfortunately, biax lamps cannot be used in currently available flow-thru fixtures, such as illustrated in FIG. 2, because the twin tube design of such light bulbs creates substantial turbulence. With the present invention this problem is eliminated because the shape of the housing and lens eliminates the effects of the bulbs shape.

Figure 6:
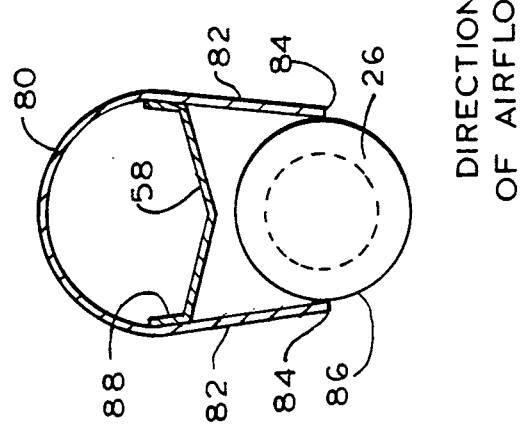
FIG. 6 is a sectional view similar to FIG. 5 but of another embodiment of the housing or shield.

In another embodiment of the invention, illustrated in FIG. 6, the teardrop shaped lens 64 may be eliminated. This construction can be used in an economy version of the light fixture, which does not require as high a level of cleanroom application. In this embodiment a generally semi-cylindrical elongated housing or shield 80 is provided for the individual luminaires or light fixtures, with elongated legs 82 extending therefrom. The legs 82 are tapered towards each other, so as to terminate at ends 84 located closely adjacent the periphery 86 of bulb 26. Again, a reflector 58 is provided which has a generally flat V-shape that can be pop riveted, or the like, at flanges 88 to legs 82 of housing 80. In this embodiment, housing 80 may be formed of clear plastic with the reflector 58 being formed of metal or plastic having an appropriate reflective surface. The tapered legs 82 of the housing accomplish substantially the same purpose of guiding the laminar flow around the bulbs as teardrop lens 64, at least for situations which do not demand extremely low particle measures.

Another problem sometimes encountered with conventional light fixtures or troffers for cleanrooms occurs because of the stringent sealing requirements needed to ensure that all air flow into the room passes only through the HEPA filters. Thus, in order to make electrical connections, a normal electrical conduit is unacceptable and sealed airtight conduit must be used. The preferred conduit of this type is sold under the trademark SEALTITE and consists of ½" conduit with a thick coating of PVC plastic on the outside. This construction makes the conduit extremely stiff and hard for contractors to work with.

Figure 9:
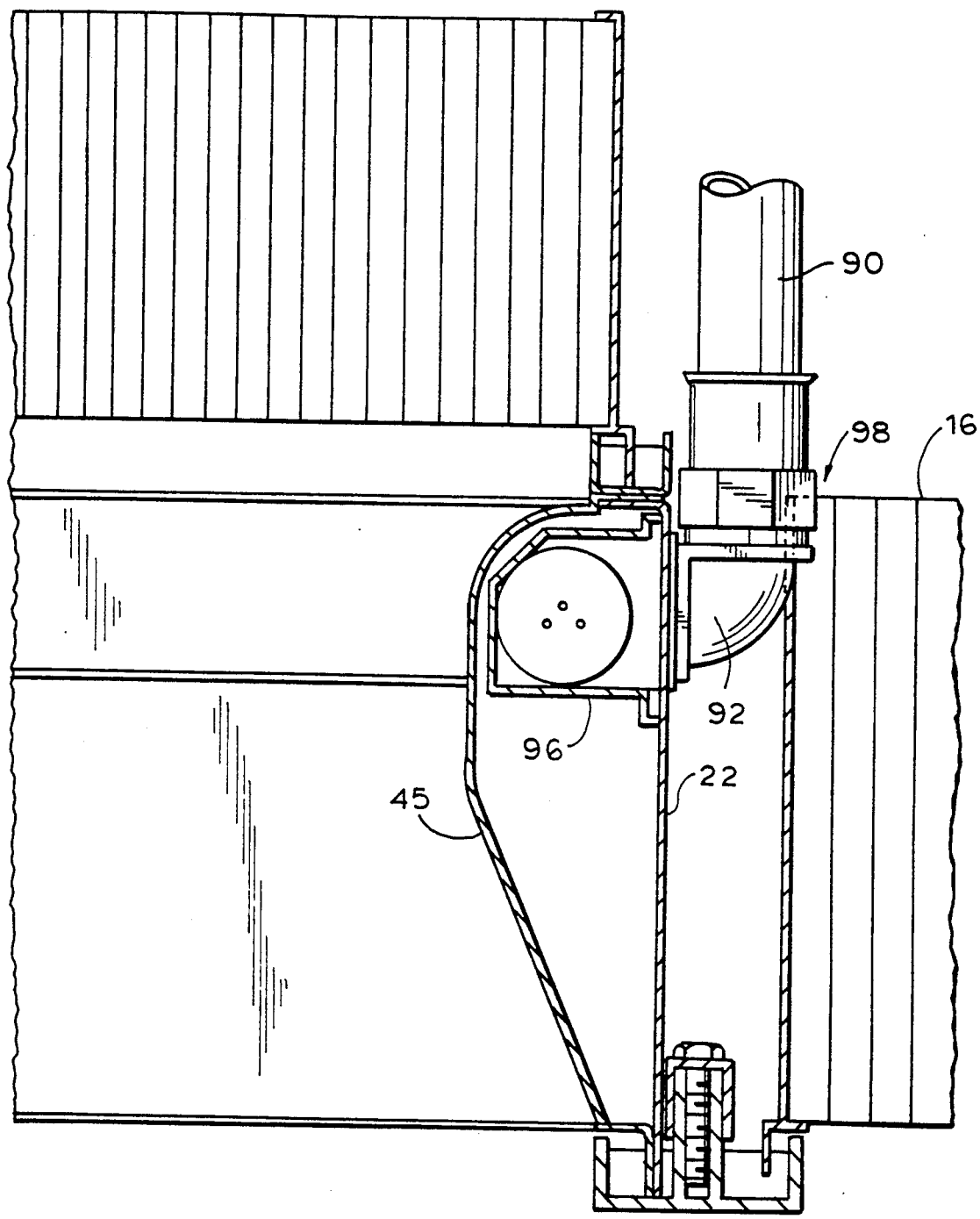
FIG. 9 is a view similar to FIG. 8 of a prior art junction box arrangement for a troffer light fixture.
Figure 10:
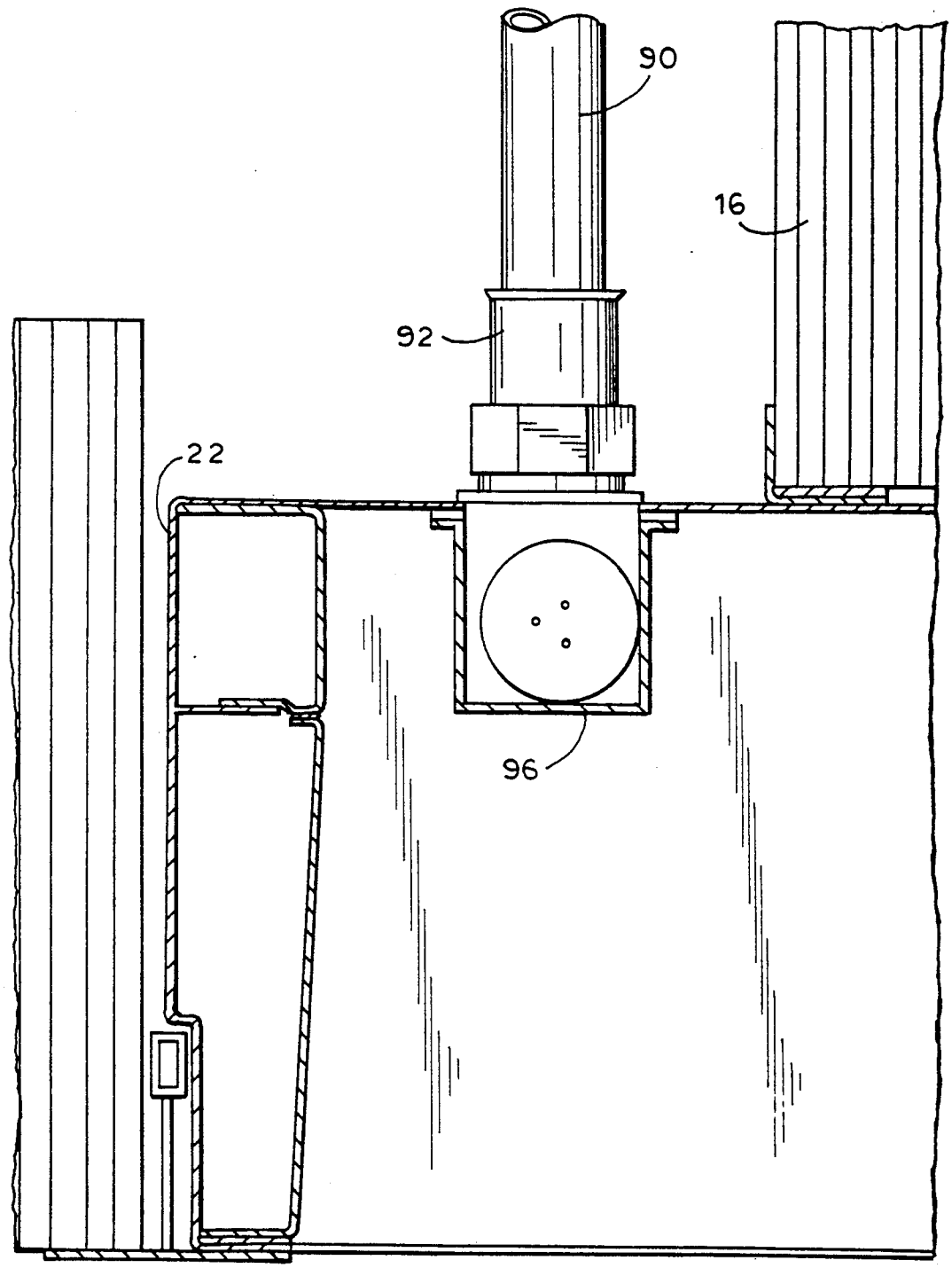
FIG. 10 is a prior art view of another junction box arrangement for a prior art light fixture.

The normal procedure for installing conventional light troffers of the type shown in FIG. 2 is illustrated in FIGS. 9 and 10 of the drawing. Typically, the conduit 90 runs straight down from the ceiling to a position adjacent the side wall 22 of the flow-thru troffer. At this side wall the removable inner reflector wall is enlarged at its upper end in order to accommodate in the chamber 47 the required electrical junction box 96. The latter is mounted on the exterior wall of the troffer frame 22 in the chamber 47.

In the typical installation there normally is not enough room in the space between the wall 22 and the adjacent HEPA filter to receive the connector 92 which guides cable 90 into and seals the junction box. Because the adjacent HEPA filter is typically four inches to as much as twelve inches high, the connector will interfere with the adjacent filter. A common solution then is for the contractor to gouge away the filter at the area 98 with a knife until it clears the connector 92. Gouging the filter in this way defeats the purpose of the filter and allows unfiltered particles to bypass the filter and flow from the air distribution chamber above the troffer into the cleanroom therebelow.

Another prior art alternative is illustrated in FIG. 10. In this embodiment the conduit 90 comes straight down to the connector 92 and the junction box 96 is located within the confines of frame 22. This avoids the problem of gouging of the adjacent filter, but requires filter 16 above the troffer to be shortened by as much as six inches at one end. This effectively reduces the area of the filter for that grid square by 12%, thereby reducing the effectiveness of having a filter in every grid square.

Figure 7:
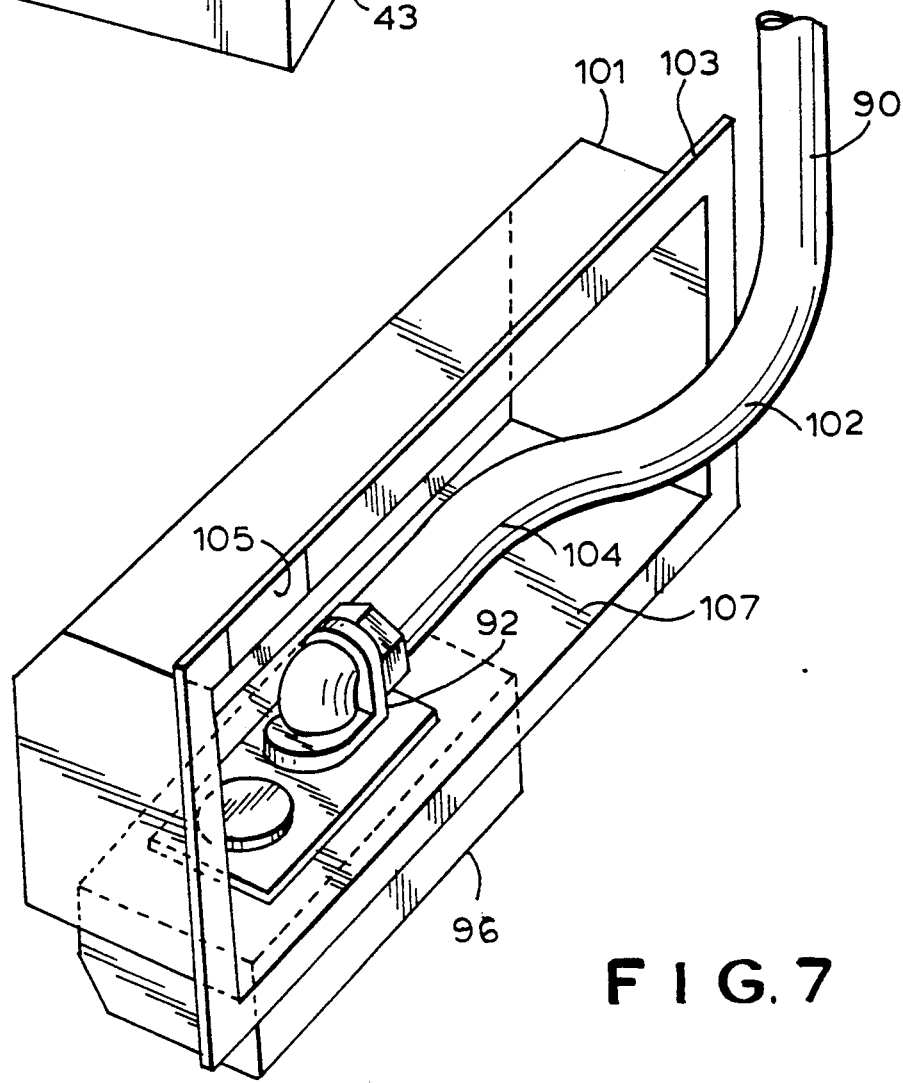
FIG. 7 is a enlarged perspective view of the conduit box for the fixture of FIG. 3.

In accordance with the present invention as illustrated in FIGS. 4, 7, 8 and 11, the outer side wall 99 of frame 40 at which the electrical connection is made has an elongated opening 100 formed in it and in which an elongated conduit box 101 is mounted. The box has a peripheral flange 103 sealed to the edge of the opening 100 by a silicone bead 105, or the like, to prevent air infiltration into chamber 47. The conduit box provides a cavity in the side of the troffer into which the conduit 90 can be bent. Thus, as seen in FIGS. 3, 4 and 7 the conduit passes down vertically between adjacent HEPA filters, is bent at a first 90° turn 102, laterally inwardly into conduit box 99 and then bent through a further turn 104 so that it can join the electrical connector 92 in the usual way. As seen in FIGS. 3, 4 and 7, in this case the junction box 96 is turned 90° from the conventional position illustrated in the prior art device of FIG. 9, and is secured to the wall 107 of conduit box 99 but still within cavity 47. The junction box is secured to wall 107 in any conventional manner. By this arrangement, the HEPA filters are not disturbed in any way by the presence of the electrical conduit or the junction boxes.

Accordingly, it is seen that a relatively simply constructed light fixture is provided which will maintain laminar air flow under adverse conditions while providing maximum lighting output and lighting efficiency.

Although illustrative embodiments of the invention have been described herein with reference to the accompanying drawings, it is to be understood that various changes and modifications ma be effected therein by those skilled in the art without departing from the scope or spirit of this invention.

What is claimed is:

1. A light fixture comprising a frame, means in the frame for mounting an air filter/distribution device therein to direct air in a predetermined direction from the air filter/distribution device to a space below it, and a plurality of individual lighting elements in the frame beneath said mounting means in the direction of air flow, said individual lighting elements each comprising an upper generally semi-cylindrical elongated shield positioned to be directly beneath an air filter/distribution device in the frame and arranged to open downwardly in the direction of air flow, means for mounting an elongated light bulb beneath the shield in the direction of air flow; and an elongated lens having a generally teardrop shape in transverse cross-section mounted on the shield for enclosing the bulb positioned beneath the shield, whereby air flowing from an air filter/distribution device in the frame flows over and around said shield and lens in a generally laminar flow.

2. A light fixture comprising a frame, means in the frame for mounting an air filter/distribution device therein to direct air in a predetermined direction from the air filter/distribution device to a space below it, and a plurality of individual lighting elements in the frame beneath said mounting means in the direction of air flow, said individual lighting elements each comprising an upper generally semi-cylindrical elongated shield positioned to open downwardly in the direction of air flow, means for mounting an elongated light bulb beneath the shield. in the direction of air flow; and an elongated cross-section mounted on the shield for enclosing the bulb positioned beneath the shield; and a reflector mounted within said shield above said bulb.

3. A light fixture as defined in claim 2 wherein said reflector is V-shaped in transverse cross-section with the apex thereof closer to the bulb than the remainder of the reflector.

4. A light fixture as defined in claim 3 wherein said lens and said shield have means formed thereon for snap locking the lens to the shield.

5. A light fixture comprising a frame, means in the frame for mounting an air filter/distribution device therein to direct air in a predetermined direction from the air filter/distribution device to a space below it. and a plurality of individual lighting elements in the frame beneath said mounting means in the direction of air flow, said individual lighting elements being located directly below an air filter/distribution device in the frame and being laterally spaced from each other to permit air flow between them, said lighting elements each comprising a separate elongated generally semi-cylindrical shield positioned to open downwardly in the direction of air flow and means for mounting an elongated light bulb beneath said shield in the direction of air flow whereby air flowing from an air filter/distribution device flows over and around the shield between the lighting elements in a generally laminar air flow.

6. A light fixture as defined in claim 5 including a reflector mounted within each of said shields.

7. A light fixture comprising a frame, means in the frame for mounting an air filter/distribution device therein to direct air in a predetermined direction form the air filter/distribution device to a space below it, and a plurality of individual lighting elements in the frame beneath said mounting means in the direction of air flow, said individual lighting elements each comprising an elongated generally semi-cylindrical shield positioned to open downwardly in the direction of air flow, means for mounting an elongated light bulb beneath said shield in the direction of air flow, and a reflector mounted within each of said shields; each of said reflectors being located above the bulb in the direction of air flow and being generally V-shaped in transverse cross-section an defining an apex, said reflectors being positioned with the apex thereof closer to its associated bulb than the remainder of the reflector.

8. A light fixture as defined in claim 5 wherein said semi-cylindrical shields have elongated spaced leg portions which extend to a position partly encompassing the bulb.

9. A light fixture comprising a frame, means in the frame for mounting an air filter/distribution device therein to direct air in a predetermined direction from the air filter/distribution device to a space below it, and a plurality of individual lighting elements in the frame beneath said mounting means in the direction of air flow, said individual lighting elements each comprising an elongated generally semi-cylindrical shield positioned to open downwardly in the direction of air flow, means for mounting an elongated light bulb beneath said shield in the direction of air flow; said semi-cylindrical shields having elongated spaced leg portions which extend to a position partly encompassing the bulb; and said leg portions being inclined towards each other and terminate at positions adjacent the surface of a bulb beneath the shield.

10. A light fixture as defined in claim 9 including reflectors mounted within the shields.

11. A light fixture as defined in claim 10 wherein said reflectors are respectively located above the bulbs in the direction of air flow and are generally V-shaped in transverse cross-section to define apices therein; said reflectors being positioned with the apices thereof closer to the bulb than the remainder of the reflector.

12. A light fixture as defined in claim 5 including elongated lenses respectively removably mounted on said legs of the shields to encompass a bulb therein, said lenses having a generally teardrop peripheral shape in transverse cross-section.

13. A light fixture as defined in claim 12 wherein said legs of the shields and said lenses have cooperating means for releasably securing the lenses to the shields.

14. A light fixture as defined in claim 13 including a reflector mounted within each of said shields.

15. A light fixture comprising a frame, means in the frame for mounting an air filter/distribution device therein to direct air in a predetermined direction from the air filter/distribution device to a space below it, and a plurality of individual lighting elements in the frame beneath said mounting means in the direction of air flow, said individual lighting elements each comprising an elongated generally semi-cylindrical shield positioned to open downwardly in the direction of air flow, means for mounting an elongated light bulb beneath said shield in the direction of air flow and elongated lenses respectively removably mounted on said legs of the shields to encompass a bulb therein, said lenses having a generally teardrop peripheral shape in transverse cross-section; said legs of the shields and said lenses having cooperating means for releasably securing the lenses to the shields; and a reflector mounted within each of said shields; said reflectors being located above the bulbs in the direction of air flow and being generally V-shaped in transverse cross-section to define apices therein; said reflectors being positioned with the apices thereof closer to the bulbs than the remainder of the reflectors.

16. A light fixture as defined in claim 5 wherein said air filter/distribution device is a high efficiency particulate air filter.

17. A light fixture as defined in claim 16 wherein said semi-cylindrical shields are spaced below said means for mounting an air filter/distribution device by a predetermined dimension and said frame includes means located between the mounting means and the shields, of the light fixture for supporting an air diffuser therebetween.

18. A light fixture as defined in claim 11 wherein said shields are formed of plastic.

19. A light fixture as defined in claim 5 wherein said frame includes an external substantially air tight peripheral wall and an internal removable wall having a reflective surface thereon facing said light fixtures, said walls defining a cavity therebetween.

20. A light fixture as defined in claim 19 wherein said semi-cylindrical shields have elongated space leg portions which extend to a position partly encompassing the bulb.

21. A light fixture comprising a frame, means in the frame for mounting an air filter/distribution device therein to direct air in a predetermined direction from the air filter/distribution device to a space below it, and a plurality of individual lighting elements in the frame beneath said mounting means in the direction of air flow, said individual lighting elements each comprising an elongated generally semi-cylindrical shield positioned to open downwardly in the direction of air flow, means for mounting an elongated light bulb beneath said shield in the direction of air flow; said frame including an external substantially air tight peripheral wall and an internal removable wall having a reflective surface thereon facing said light fixtures, said walls defining a cavity therebetween; and elongated lenses respectively removably mounted on said legs of the shields to encompass a bulb therein, said lenses having a generally teardrop peripheral shape in transverse cross-section.

22. A light fixture as defined in claim 21 wherein said lenses have opposed end portions whose edges conform to the shape and inclination of the adjacent internal removable walls to insure smooth air flow at the walls.

23. A light fixture comprising a frame, means in the frame for mounting an air filter/distribution device therein to direct air in a predetermined direction from the air filter/distribution device to a space below it, and a plurality of individual lighting elements in the frame beneath said mounting means in the direction of air flow, said individual lighting elements each comprising an elongated generally semi-cylindrical shield positioned to open downwardly in the direction of air flow, means for mounting an elongated light bulb beneath said shield in the direction of air flow; said frame including an external peripheral side wall, said side wall including an inset conduit box located within the perimeter of the frame; and an electrical junction box mounted on said inset conduit box; said junction box including an electrical connector mounted thereon located within said inset conduit box; said inset conduit box having a predetermined length sufficient to permit an electrical supply conduit extending vertically along the exterior of the frame to be bent in a first bend inwardly into the conduit box and then in a direction generally perpendicular to the first bend for receipt in said electrical connector whereby the electrical connections for the light fixture are made within the confines of the fixture.

24. A light fixture as defined in claim 23 including an interior removable wall removably mounted in said frame to define a chamber, with said external side wall, said junction box being located within said chamber.

25. A light fixture as defined in claim 24 wherein said inner wall has a reflector surface.

26. A light fixture for use with a high efficiency particulate air filter comprising a peripheral frame, means in the frame for mounting a high efficiency particulate air filter therein to direct air in a predetermined direction from the filter to a space below it; and a plurality of individual lighting elements mounted in said frame in spaced relation to each other directly beneath the high efficiency particulate air filter in the direction of air flow whereby air flowing from the filter flows over and between the lighting elements; said individual lighting elements each including an elongated streamlined shield mounted in said frame and including beneath the shield means for mounting an elongated light bulb therein, whereby the streamlined shields direct air flowing from the filter in a non-turbulent flow around the light bulbs mounted therein.

27. A light fixture as defined in claim 26 including a reflector mounted within each of said shields.

28. A light fixture for use with a high efficiency particulate air filter comprising a peripheral frame, means in the frame for mounting a high efficiency particulate air filter therein to direct air in a predetermined direction from the filter to a space below it; and a plurality of individual lighting elements mounted in said frame directly beneath the high efficiency particulate air filter in the direction of air flow; said individual lighting elements each including an elongated streamlined shield mounted in said frame and including beneath the shield means for mounting an elongated light bulb therein, whereby the streamlined shields direct air flowing from the filter in a non-turbulent flow around the light bulbs mounted therein; and a reflector mounted within each of said shields; said reflectors being located above their associated bulbs in the direction of air flow and being generally V-shaped in transverse cross-section to define apices therein; said reflectors being positioned with the apices thereof closer to the bulbs than the remainder of the reflectors.

29. A light fixture as defined in claim 26 wherein each of said shields comprises an elongated semi-cylindrical section between the filter and its associated bulb and a pair of elongated spaced leg portions extending therefrom to a position partly encompassing the bulb.

30. A light fixture for use with a high efficiency particulate air filter comprising a peripheral frame, means in the frame for mounting a high efficiency particulate air filter therein to direct air in a predetermined direction from the filter to a space below it; and a plurality of individual lighting elements mounted in said frame directly beneath the high efficiency particulate air filter in the direction of air flow; said individual lighting elements each including an elongated streamlined shield mounted in said frame and including beneath the shield means for mounting an elongated light bulb therein, whereby the streamlined shields direct air flowing from the filter in a non-turbulent flow around the light bulbs mounted therein; each of said shields comprising an elongated semi-cylindrical section between the filter and its associated bulb and a pair of elongated spaced leg portions extending therefrom to a position partly encompassing the bulb; said leg portions being inclined towards each other and terminate at positions adjacent the surface of a bulb mounted beneath the shield.

31. A light fixture as defined in claim 30 including a reflector mounted within each of said shields.

32. A light fixture as defined in claim 31 wherein said reflectors are located above the bulbs in the direction of air flow and are generally V-shaped in transverse cross-section to define apices therein; said reflectors being positioned with the apices thereof closer to the bulb than the remainder of the reflectors.

33. A light fixture as defined in claim 26 wherein said shields each comprise an elongated semi-cylindrical section between the filter and its associated bulb and a pair of spaced leg portions extending therefrom, and elongated lenses respectively removably mounted on said legs of the shields to encompass a bulb therein, said lenses having a generally teardrop peripheral shape in transverse cross-section.

34. A light fixture as defined in claim 33 wherein said legs of said shields and said lenses have cooperating means for releasably securing the lens to the shields.

35. A light fixture as defined in claim 34 including a reflector mounted within each of said shields.

36. A light fixture as defined in claim 35 wherein said reflectors ar located above the bulbs in the direction of air flow and are generally V-shaped in transverse cross-section; said reflectors being positioned with the apices thereof closer to the bulbs than the remainder of the reflectors.

37. A light fixture as defined in claim 26 wherein said shields are spaced below said means for mounting an air distribution device by a predetermined dimension and said frame includes means located between the mounting means and the shields for supporting an air diffuser therebetween.

38. A light fixture as defined in claim 26 wherein said shields are formed of plastic.

39. A light fixture as defined in claim 27 wherein said frame includes an external peripheral side wall, said side wall including an inset conduit box located within the perimeter of the frame; and an electrical junction box mounted on said conduit box; said junction box including an electrical connector mounted thereon located within said conduit box; said inset conduit box having a predetermined length sufficient to permit an electrical supply conduit extending vertically along the exterior of the frame to be bent inwardly into the inset conduit box and then in a direction generally perpendicular to the first bend for receipt in said electrical connector whereby the electrical connections for the light fixture are made within the confines of the fixture.

40. A light fixture as defined in claim 39 including an interior removable wall removably mounted in said frame to define a chamber, with said external side wall, said junction box being located within said chamber.

41. A light fixture as defined in claim 40 wherein said inner wall has a reflector surface.

* * * * *